Feb. 18, 1969  J. READMAN  3,428,379
BEARING ASSEMBLY AND METHOD OF MANUFACTURE OF SAME
Filed Sept. 26, 1966
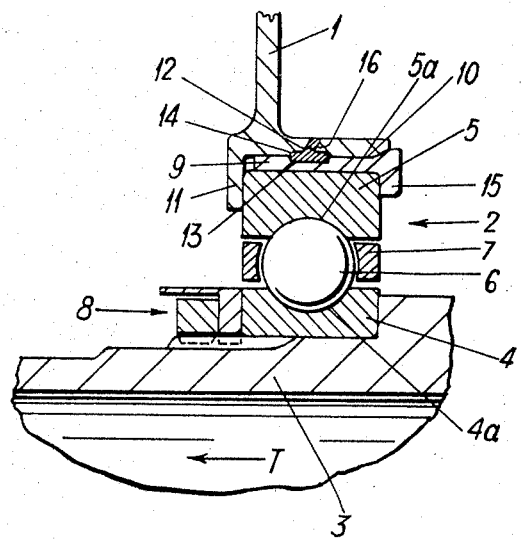

United States Patent Office 3,428,379
Patented Feb. 18, 1969

3,428,379
BEARING ASSEMBLY AND METHOD OF
MANUFACTURE OF SAME
John Readman, Allastree, Derby, England, assignor to
Rolls-Royce Limited, Derby, England, a British
company
Filed Sept. 26, 1966, Ser. No. 581,826
Claims priority, application Great Britain, Oct. 27, 1965,
45,588/65
U.S. Cl. 308—236                  7 Claims
Int. Cl. F16c 33/30

ABSTRACT OF THE DISCLOSURE

A bearing assembly comprising an anti-friction bearing having a pair of races and rolling elements disposed therebetween, a sleeve disposed around and in contact with one of said races, a support member, the said one race being mounted from the support member by the sleeve, the sleeve and the support member each having an annular groove, and a key disposed between the sleeve and the support member and engaging said grooves the support member comprising an annular flange integral with the said support member and adapted to transmit loads from the bearing race means to the said support member in a predetermined direction.

---

This invention relates to a bearing assembly.

In a broad aspect, the present invention provides a bearing assembly comprising an anti-friction bearing having a pair of races and rolling elements disposed therebetween, a sleeve disposed around and in contact with one of said races, a support member, the said one race being mounted from the support member by the sleeve, the sleeve and the support member each having an annular groove, a key disposed between the sleeve and the support member and engaging said grooves, the support member comprising an annular flange integral with the said support member and adapted to transmit loads from the bearing race means to the said support member in a predetermined direction.

Preferably, a port is formed in the said support member, said port communicating with said annular channels and enabling a key-forming liquid to be poured thereinto.

The invention comprises in another broad aspect, a bearing assembly including a bearing race and means for locating said bearing race relative to a support member, said means comprising a key located between, or a layer of material adhered to, said support member and said bearing race, or means secured thereto, said key or layer having been formed by the solidification of a liquid poured between said support member and said bearing race, or means secured thereto.

The said key may be formed of synthetic resin material.

According to one embodiment of the invention, said support member comprises a thrust-transmitting member fixed relative to said support member and adapted to transmit loads from the bearing race means to the said member in a predetermined direction. The thrust transmitting member may comprise an annular flange integral with the said support member.

The sleeve may be formed of synthetic resin material.

An advantage of the method according to the invention is that, since the key or layer may be formed in situ by the pouring of the liquid, said key or layer may be formed in positions which are otherwise inaccessible, or accessible only with difficulty. The invention has, therefore, particular applicability to the mounting of bearings in gas turbine engines.

The invention will be described, merely by way of example, with reference to the accompanying drawing which shows an axial cut-away section through the bearing assembly according to a preferred embodiment of the invention.

Referring to the drawing, a gas turbine engine (not shown) has fixed engine structure 1 which is adapted to support a bearing assembly 2 within which a shaft 3 is rotatably mounted. The shaft 3 carries a compressor and a turbine (not shown) of the gas turbine engine.

The bearing assembly 2 includes relatively rotatable inner and outer annular races 4, 5 respectively. The bearing assembly 2 illustrated in this example is a thrust ball bearing, and the respective inner and outer annular races 4, 5 are provided with respective bearing tracks 4a, 5a, between which a plurality of rolling elements, in this case, steel balls 6, are accommodated. The spacing of the balls 6 is maintained, in the conventional manner, by a ball cage 7.

The bearing inner race 4 is fixed around the shaft 3 and retained axially thereon by a locknut assembly 8, while the bearing outer race 5 is fixed relative to the engine structure 1. To this end a sleeve 9 is secured to the bearing outer race 5, the sleeve 9 fitting into a hollow cylindrical bore 10, coaxial with the shaft 3, in the structure 1.

The bearing assembly 2 is designed to transmit axial thrust loads in the direction of arrow T from the shaft 3 to the engine structure 1. For this purpose an annular flange 11 is provided on the structure 1. One of the axially facing surfaces of the bearing outer race 5 is urged into contact with the flange 11 by thrust loads in the direction of arrow T so that such loads are transmitted directly to the structure 1.

It will be appreciated that the axial load on the bearing assembly 2 is normally in the direction of arrow T, but that considerable reverse axial loads, due, for example, to engine vibration, can occur in the reverse direction to that of arrow T. It has been found that sufficient resistance to such reverse axial loads can be provided by a key 12 located between the sleeve 9 and the structure 1.

The key 12 is formed of a substance hardenable from the liquid state, preferably a synthetic resin of the epoxy type. Key 12 is accommodated in a substantially closed space formed between two facing annular channels 13, 14, provided respectively in the sleeve 9 and the cylindrical bore 10. The strength of the key in shear is quite sufficient to retain the sleeve 9 axially with respect to the structure 1 against reverse loads in the direction opposite to that of arrow T substantially equal to the normal thrust load on the bearing. The bearing outer race 5 is retained axially against movement relative to the sleeve 9 in the direction opposite to that of arrow T by a flange 15 on the sleeve 9 which engages the axially facing surfaces of the race 5 opposite to that engaged by the flange 11.

An important feature of the present inveniton is that the synthetic resin key 12 can be formed in situ. Thus an access port 16 is drilled in the wall of bore 10 to communicate with the channel 14. When the bearing assembly 2 is correctly located with respect to the structure 1, as shown in the drawing, molten resin is poured into the space between channels 13, 14 through the port 16. When the resin hardens, it forms the solid annular key 12 which is capable of transmitting forces from the outer bearing race 5 to the structure 1.

It will be appreciated that, although the use of an epoxy type resin for the formation of the key 12 has been described in the specific embodiment, other suitable synthetic resins, or metals, could also be employed for forming the key 12. Also, the sleeve 9 can conveniently be formed from synthetic resin material, as this enables the sleeve 9 to be machined away when disassembling the bearing without damaging the other components thereof.

Although the specific example described above relates to the location of a bearing outer race with respect to fixed structure, it will be understood that the method of the present invention is applicable to the location of bearing races to members generally. Thus the method could also be used to retain the bearing inner race 4 on the shaft 3. For this purpose it is undesirable to form an annular channel, similar to the channel 14 in the fixed structure, in the surface of the shaft 3, since this would weaken the shaft. It is therefore preferable to use a synthetic resin which adheres to the shaft 3 on hardening and forms a bond between the shaft 3 and the inner race 4.

If a synthetic resin is used which adheres both to the bearing race (or the sleeve or other means secured thereto) and the member relative to which the bearing race is to be retained, such as the shaft 3 or fixed structure 1, then clearly both the annular channels as hereinbefore described may be dispensed with, so that on hardening the resin forms, instead of a key, a bonded layer which serves the same purpose as the key 12. An advantage of forming the resin as a key rather than a layer is, however, that the former is able to retain the bearing race in position even should the adhesive bond between the resin and the surface adjacent thereto break down.

I claim:

1. A bearing assembly comprising an anti-friction bearing having a pair of races and rolling elements disposed therebetween, a sleeve disposed around and in contact with one of said races, a support member, the said one race being mounted from the support member by the sleeve, the sleeve and the support member each having an annular groove, a key disposed between the sleeve and the support member and engaging said grooves, the support member comprising an annular flange integral with the said support member and adapted to transmit loads from the bearing race means to the said support member in a predetermined direction.

2. A bearing assembly as claimed in claim 1 wherein the said key is formed from synthetic resin material.

3. A bearing assembly as claimed in claim 1 wherein a port is formed in the said support member, said port communicating with said annular channels and enabling a key-forming liquid to be poured thereinto.

4. A bearing assembly as claimed in claim 1 wherein said sleeve is formed of synthetic resin material.

5. A bearing assembly as claimed in claim 1 wherein the bearing assembly supports a shaft of a gas turbine engine.

6. A bearing assembly as claimed in claim 1 wherein the sleeve has a radially extending flange which engages an end face of the said one race.

7. A bearing assembly as claimed in claim 1 wherein the support member comprises fixed bearing support structure.

References Cited

UNITED STATES PATENTS

| 2,711,074 | 6/1955 | Howard | 230—116 |
|---|---|---|---|
| 1,902,095 | 3/1933 | Parsons | 230—116 |
| 2,051,704 | 8/1936 | Harris | 308—236 |
| 2,686,091 | 8/1954 | Young | 308—236 |
| 2,845,696 | 8/1958 | De Bourgues | 29—460 |
| 3,359,613 | 12/1967 | Rye | 308—9 |

FOREIGN PATENTS

| 981,329 | 1/1965 | Great Britain. |
|---|---|---|
| 76,621 | 7/1948 | Czechoslovakia. |

EDGAR W. GEOHEGAN, *Primary Examiner.*

F. SUSKO, *Assistant Examiner.*